INVENTOR
G. A. VAN DINE
BY
Charles Scott Phelan
ATTORNEY

DETECTOR FOR BIPOLAR DIGITAL SIGNALS

Filed Dec. 13, 1965 Sheet 2 of 2

United States Patent Office 3,441,747
Patented Apr. 29, 1969

3,441,747

DETECTOR FOR BIPOLAR DIGITAL SIGNALS

Gilbert A. Van Dine, Middletown, N.J., assignor to Bell Telephone Laboratories, Incorporated, New York, N.Y., a corporation of New York Filed Dec. 13, 1965, Ser. No. 513,424
Int. Cl. H03k 5/20
U.S. Cl. 307—236 19 Claims

ABSTRACT OF THE DISCLOSURE

A circuit is developed for detecting bipolar signals from a magnetic tape. The circuit includes diodes for threshold detection and for steering positive and negative signals respectively to base and emitter electrodes of a transistor. The transistor is arranged to operate as a common-emitter amplifier and as a common-base amplifier respectively for positive and negative polarity signals. The transistor circuit acts as a current generator producing full-wave rectified output signals. A coil in the collector circuit differentiates output signals prior to peak detection by a current switch.

This invention relates to a semiconductor detector circuit more particularly described as a bipolar electrical signal detector.

In communications systems and in data processing systems it is often necessary to detect information from a series of analog bipolar electrical input signals. These signals or pulses, used to transmit information, typically are somewhat distorted by circuit attenuation and noise thereby introducing the possibility of errors occurring in the information when it is detected. Detection circuits are designed to reduce the possibility of error occurrence by circumventing the effects of distortion through means of threshold and peak-time detection.

Each input pulse is initiated at the beginning of an interval in which the amplitude of the pulse varies from substantially zero to a peak and back substantially to zero. The maximum amplitude of each pulse differs from the maximum amplitude of other pulses in the series because of circuit characteristics, however, the peak amplitude of each input pulse occurs in approximate time coincidence with the center of the pulse interval.

It is a practice in the prior art to establish a predetermined threshold voltage in signal detection circuits so that input pulses having a voltage above the threshold are detected and noise signals having a voltage below the threshold are eliminated. When one of these input pulses is detected, a resultant clipped output pulse occurs within the pulse interval following a delay lasting from the beginning of the interval until the input signal reaches the threshold voltage. This delay is a variable from one pulse to another because an input pulse with a large amplitude reaches the threshold voltage sooner during its interval than a signal with a smaller amplitude. The large and the small amplitude pulses both produce a threshold-clipped pulse having a peak amplitude in approximate time coincidence with the center of its pulse interval. Therefore, reconstruction of the original information into signals that have consistent time positioning within their intervals requires the use of a device that detects the time at which each clipped pulse reaches its peak amplitude. In order to accomplish peak-time detection, the bipolar input signals are full-wave rectified and applied to subsequent circuitry that operates on unipolar signals only.

Prior art rectifiers include a transformer that requires special considerations of space and frequency response for proper circuit design in addition to its high initial cost. Additional prior art devices have been utilized to differentiate full-wave rectified signals and produce output signals having a reference potential crossing in approximate time coincidence with each peak of the input signals. These output signals are then used to trigger subsequent pulse forming circuits which produce well-shaped unipolar rectangular pulses each having a leading edge in approximate time coincidence with the peak of one of the input pulses.

Because the many previously described functions must be performed by a bipolar detector to produce a satisfactory series of output pulses in correct time relation with a series of distorted input signals, it has been necessary to utilize complicated circuit arrangements having numerous components. Such complicated circuits are inherently less reliable in operation and more expensive to build and maintain than simpler circuits with fewer components.

Therefore it is an object of this invention to improve the reliability and reduce the cost of a circuit for detecting bipolar electrical signals by reducing the number of components and the complexity of a circuit which performs the essential functions of bipolar detection.

It is another object to produce an output signal pulse in time position independent of input signal amplitude variations and input signal polarity.

It is a further object to produce a full-wave rectified signal without utilizing an arrangement including a transformer.

These and other objects of the invention are realized in an illustrative embodiment thereof which is a transistorized circuit for detecting a series of bipolar electrical input signals induced by a magnetic tape utilizing a non-return-to-zero scheme for writing on the tape. The circuit includes diodes which establish a threshold and steer positive and negative polarity input signals, respectively, to the base and emitter electrodes of a transistor. The transistor is arranged to operate as a common-emitter amplifier and as a common-base amplifier, respectively, for positive and negative polarity signals. The transistor circuit acts as a current generator producing full-wave rectified output signals. An inductance inserted in the collector circuit performs differentiation of the transistor output current signals prior to peak detection by a suitable current switch. The current switch produces a series of pulses which initiate a series of output signals each having a leading edge in approximate time coincidence with the peak amplitude of one of the series of input signals.

A feature of the invention is the advantageous utilization of both the common-emitter and the common base characteristics of a single transistor in a circuit configuration performing full-wave rectification of a bipolar input signal.

Another feature is the utilization of diodes in conjunction with a transistor circuit to perform threshold detection and also to steer input signals of one polarity to a first input and signals of opposite polarity to a second input of the transistor circuit which performs full-wave rectification.

Another feature is the changing of the effective configuration of a transistor circuit in response to the polarity of an input signal to take advantage of two configurations of a single transistor in performing full-wave rectification.

An additional feature is the utilization of an inductance in the collector circuit of a transistor that is performing full-wave rectification on bipolar input signals to differentiate output signals of the transistor by taking advantage of the collector acting as a virtual current source for both a common-emitter configuration and a common-base configuration.

A further feature is a peak-time detector including a current switch comprising a substantially ideal current source having its output current switched from a transistor to a diode when a higher potential exists on an input to the diode than on an input to the transistor.

A better understanding of the invention may be derived from the detailed description following if that description is considered with respect to the attached drawings in which.

Figure 1:
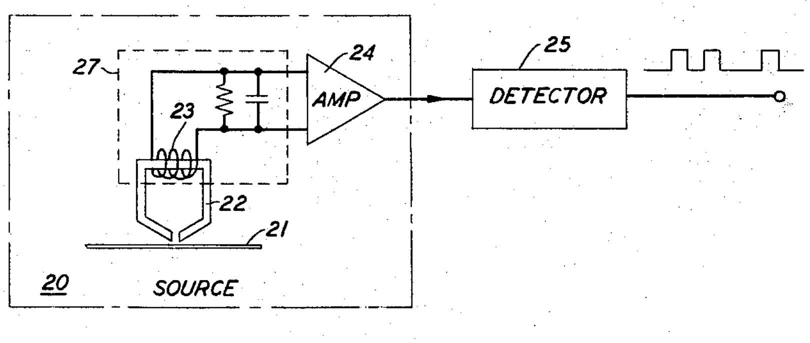
FIG. 1 is a block diagram showing a bipolar signal detector.
Figure 3:
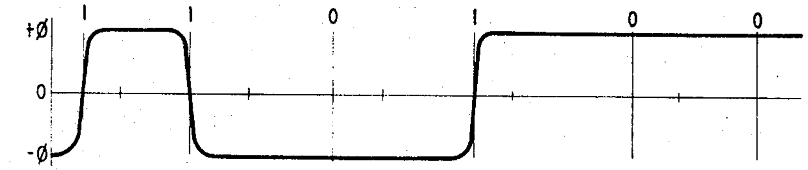
FIGS. 3, 4, 5, 6, 7, 8, 9, and 10 show key waveforms representing information as it is detected and reconstructed by the embodiments of FIGS. 1 and 2.
Figure 4:
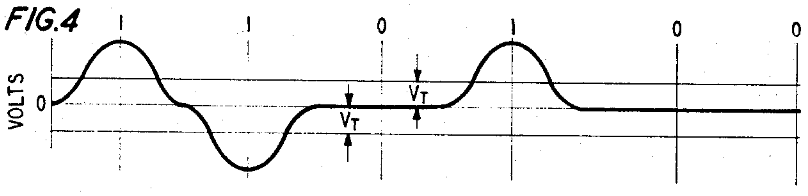

Referring now to FIG. 1, there is shown a source 20 which is a read-out circuit of a magnetic recording system that produces bipolar electrical signals. A magnetic sensitive material 21 stores digital information in small segments of the material utilizing a non-return-to-zero scheme for recording binary coded information. As shown in FIG. 3, a binary digit ONE is represented by a change of polarization of the flux in a segment of the magnetic material and a binary digit ZERO is represented by no change of polarization in a segment of the magnetic material. Binary information in the form of ONES and ZEROS is taken sequentially from the segments of the magnetic material 21 by passing the material 21 near a magnetic read head 22 which causes a voltage impulse to be induced in a coil 23 in response to each rapid change of flux along the magnetic material. The impulses are applied to a critically damped tank circuit 27 which responds with one oscillation for each impulse. The signals produced by the tank circuit 27 in response to the series of digits represented in FIG. 3 are shown in FIG. 4 and are somewhat delayed from the flux changes shown in FIG. 3. The signals shown in FIG. 4 are dependent upon the particular recording scheme selected for use in the embodiment of this description of the invention but it is recognized that other well-known recording schemes producing bipolar read-out signals can advantageously be employed with this invention. Because the signal voltage produced by the tank circuit 27 is small in amplitude, the signals are forwarded through an amplifier 24 for preamplification prior to detection. Ideal preamplified signals produced by the amplifier 24 are in analog bipolar form similar to the waveform shown in FIG. 4, although they are often accompanied by undesirable noise signals.

The preamplified signals are applied to the input of a detector circuit 25 for conversing from analog bipolar signals into unipolar rectangular pulses representing ONES when present and representing ZEROS when absent. The detector performs threshold detection to eliminae noise having a voltage less than $V_T$ shown in FIG. 4, full-wave rectification so that output signals are of a uniform polarity, differentiation to modify each input pulse into a signal that has a reference potential crossing coinciding in time with the peak of the input pulse, reference-crossing detection to produce an output pulse leading edge transition in response to a reference potential crossing of each differentiated pulse, and output pulse width timing to terminate the output pulse a short time after the occurrence of the leading edge transition. Each analog input pulse therefore initiates the formation of a rectangular output pulse of predetermined duration commencing coincident with the peak of the input pulse.

Figure 2:
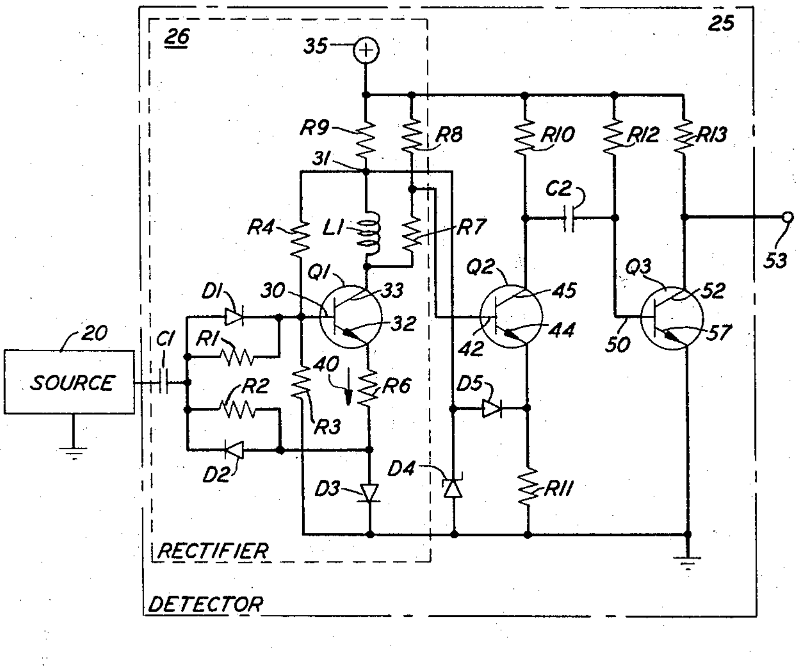
FIG. 2 is a schematic diagram of a bipolar signal detector in accordance with the invention and which produces unipolar output pulses each having a leading edge in substantial time coincidence with the peak of one of a series of input pulses.

Referring now to FIG. 2, there is shown a source 20 having the same reference designation as in FIG. 1 and producing a series of bipolar signals suitable for application to the input of a bipolar detector 25. A one transistor rectifier 26 performs threshold detection together with full-wave rectification of the bipolar input signals. In the rectifier 26 the output of the source 20 is coupled by way of a capacitor C1 and a diode D1 in a series circuit connection to a base electrode 30 of an NPN transistor Q1 for applying signals of positive polarity from the source 20 to the base electrode 30. A resistor R1 is in shunt with the diode D1. A resistor R3 is coupled between the base electrode 30 and a source of reference potential hereinafter referred to as ground for purposes of this illustration. The base electrode 30 is coupled to a terminal 31 by way of a resistor R4.

An emitter electrode 32 is coupled by way of a resistor R6 and a diode D3 in a series connection to ground. The output of the source 20 is coupled through the capacitor C1, a diode D2, and the resistor R6 in a series circuit to the emitter electrode 32 for applying signals of negative polarity from the source 20 to the emitter electrode 32. A resistor R2 is shunted across the diode D2 so that the resistors R1 and R2 form a voltage divider between the base electrode 30 and the anode of the diode D3.

The resistors R3 and R4 are selected so that they form a voltage divider which in the absence of an input signal biases the base-emitter junction of the transistor Q1 and the diode D3 so that they each conduct a negligibly small current.

The resistor R6 is selected to be equal in resistance to the resistance of the parallel combination of the resistors R3 and R4. The resistors R1 and R2 are equal to each other and are large in comparison to the resistance of the parallel combination of the resistors R3 and R4 so that the resistors R1 and R2 are negligible in a parallel connection with the combination of the resistors R3 and R4. At the common junction of the resistors R1 and R2 a potential is established to bias the capacitor C1 to a potential essentially midway between the potential of the base electrode 30 and the potential of the emitter electrode 32 regardless of leakage currents flowing through the capacitor C1 and the diodes D1 and D2.

A collector electrode 33 is coupled by way of a resistor R7 and a resistor R8 in a series connection to a power supply terminal 35. The terminal 31 is coupled to the terminal 35 by way of a resistor R9. The indicated power supply terminal 35 represents a positive polarity terminal of a grounded direct-current power supply of suitable value.

When an input signal of positive polarity is coupled from the source 20 through the capacitor C1 and the diode D1 to the base electrode 30, the transistor Q1 becomes biased to conduct as a common-emitter amplifier in the linear portion of its dynamic characteristic curve. The collector electrode 33 is fixed at a quiescent potential $V_Q$ between ground and the potential of the terminal 35. An emitter current is driven in the direction of an arrow 40 thereby biasing the diode D3 to conduct and substantially ground the resistor R6. The diode D2 is back-biased and effectively produces an open circuit.

The base input impedance $Z_{Bin}$ of a transistor is given by the formula $Z_{Bin}=(1+\beta)R_e$ where $\beta$ is the transistor common-emitter forward current transfer ratio usually having a value of 30 or more and $R_e$ is an emitter biasing resistor. The $Z_{Bin}$ is the small-signal low-frequency input impedance of a transistor in a common-emitter arrangement with the output terminals shorted and is derived from the prior art. See, for example, "Principles and Applications of Electron Devices" by Paul D. Ankrum, International Textbook Company, 1959, sections 13–5 and 13–6. In Ankrum's text, an equation 13–90 shows that $$Z_{Bin}=r_{ie}=r_b+\frac{r'_e}{(1-a)}=r_b+r'_e(1+\beta)$$

where $$r'_e=R_e+r_e$$

in a circuit having an emitter biasing resistor $R_e$. The $r_b$ is the base resistance and $r_e$ is the emitter resistance of a T-equivalent circuit for a transistor circuit. The $a$ is the common-base forward current transfer ratio. When $R_e$ is selected to be sufficiently large, $r_b$ and $r_e$ become negligible thus $Z_{Bin}=(1+\beta)R_e$. In my circuit $R_e$ is the resistor R6 which is equal to the resistance of the combination of the resistors R3 and R4. By substituting for $\beta$ and $R_e$ into this formula, the base input impedance $Z_{Bin}$ is found to be large in comparison to the parallel combination of the resistors R3 and R4. Therefore the base input impedance $Z_{Bin}$ is negligible in its parallel arrangement with the combination of resistors R3 and R4, and the resultant base input circuit impedance presented to a positive polarity signal from the source 20 is substantially the combination of the resistors R3 and R4. Because the resistor R6 has been selected to be equal to the combination of the resistors R3 and R4, the base input circuit impedance presented to a positive polarity signal is also substantially equal to the resistance of the resistor R6.

When an input signal of negative polarity is coupled through the capacitor C1, the diode D2, and the resistor R6 to the emitter electrode 32, the transistor Q1 becomes biased to conduct as a common-base amplifier in the linear portion of its dynamic characteristic curve. The negative potential of the signal applied to the anode of the diode D3 back-biases the diode D3 which produces an effective open circuit between the resistor R6 and ground. An emitter current is pulled through the resistor R6, again in the direction of the arrow 40, by the source 20.

The emitter input impedance $Z_{Efn}$ of a transistor is given by the formula $$Z_{Ein}=\frac{R_b}{(1+\beta)}$$

where $\beta$ is the transistor common-emitter forward current transfer ratio and $R_b$ is a base biasing resistance. The $Z_{Ein}$ is the small-signal low-frequency input impedance of a transistor in a common-base arrangement with the output terminals shorted and is derived from the prior art. In Ankrum's text, supra, Equation 13–86 shows that $$Z_{Ein}=r_{ib}=r_e+r'_b(1-a)=r_b+\frac{r'_b}{(1+\beta)}$$

where $$r_b'=R_b+r_b$$

in a circuit having a base biasing resistor $R_b$. The $r_e$ is the emitter resistance and $r_b$ is the base resistance of a T-equivalent circuit for a transistor circuit. The $a$ is the common-base forward current transfer ratio.

In my circuit $R_b$ is the parallel combination of the resistors R3 and R4 and therefore is equal to the resistance of the resistor R6. The $\beta$ is the same value mentioned previously in the discussion of the common-emitter configuration. When $R_b$ is selected to be sufficiently large, $r_b$ and $r_e$ become negligible thus $$Z_{Ein}=\frac{R_b}{(1+\beta)}$$

By substitution into this formula, it is found that the emitter input impedance $Z_{Ein}$ is very small in comparison with the resistor R6, so that the upper end of the resistor R6 and thus the emitter electrode 32 are considered to be virtually grounded. Because the emitter input impedance is in a series circuit with the resistor R6 and the emitter input impedance is small enough to be a virtual ground for the resistor R6, the resultant emitter input circuit impedance presented to the negative polarity signal is substantially equal to the resistance of the resistor R6. Thus it has been shown that an input signal of either positive or negative polarity encounters a resultant input circuit impedance substantially equal to the value of the resistor R6. Therefore no substantial net charge will build up on the capacitor C1 due to unequal currents flowing in the base-emitter input circuit to the transistor Q1.

As previously stated, an input signal of positive polarity applied to the base electrode 30 causes a collector to emitter current to be produced, and an input signal of negative polarity applied to the emitter electrode 32 also causes a collector to emitter current to be produced. Therefore either polarity of input signal produces a unipolar output current signal in the transistor Q1.

Both positive and negative input signals are equally amplified by this circuit because the gain of the common-emitter configuration and the gain of the common-base configuration are determined by the resistance R6 in the emitter circuit. To illustrate, consider that a positive signal from the source 20 increases by a voltage change, $+\Delta v$, which is applied to the base electrode 30. This voltage change is translated to the emitter electrode 32 through the low impedance of the base-emitter junction substantially unattenuated. The voltage change, $+\Delta v$, appears across the emitter resistor R6 while the resistor R6 is grounded through the diode D3. The voltage change, $+\Delta v$, increases the voltage drop across the resistor R6 and produces a change of emitter current $\Delta i$, which is determined by $\Delta v$ and the resistance of resistor R6 in accordance with Ohm's law. Further consider that a negative signal from the source 20 increases by a voltage change, $-\Delta v$, which is applied by way of the diode D2 to the resistor R6 while the emitter 32 is virtually grounded. The voltage change, $-\Delta v$, increases the voltage drop across the resistor R6 and produces a change of emitter current, $\Delta i$, which is determined by $-\Delta v$ and the resistance of the resistor R6 in accordance with Ohm's law. The change of emitter current, $\Delta i$, and therefore the change of the collector current are determined by the resistor R6 for a given magnitude of input signal voltage change of either polarity input signal.

In a particular application where threshold detection is advantageous the diodes D1 and D2 are selected so that they do not conduct input signals below a voltage $V_T$, as shown in FIG. 4, and thereby eliminate low level noise from the input signals. The diodes D1, D2, and D3 therefore perform both a steering function and a thresholding function in conjunction with a transistor circuit that produces unipolar output signals while presenting equal input impedance and providing equal amplification to input signals of either polarity. Thus the circuit full-wave rectifies bipolar analog input signal voltages and produces a unipolar analog output signal current no matter which polarity signal is applied from the source 20. The waveforms shown in FIG. 5 are the signal current waveforms produced at the collector electrode 33 as a result of threshold detecting and rectifying the input signals shown in FIG. 4.

In a circuit which requires differentation together with threshold clipping and full-wave rectification, such as in a bipolar peak detector, it has been found advantageous to couple an inductance L1 between the collector electrode 33 and the terminal 31. Because the transistor circuit operates as a virtual current generator for both a common-emitter configuration and a common-base configuration, the inductance L1 causes the output current to be differentiated. An output voltage signal resulting from differentiating the output current can then be applied to additional circuitry to facilitate detection of each peak of the input signals. The resistors R7 and R8 critically damp oscillations at the resonant frequency of the inductance L1 and its stray capacity. It is noted that the resistors R7 and R8 must be large enough to have only a small effect on the differentiating action of the inductance L1. The waveform shown in FIG. 6, is the voltage waveform of differentiated signals resulting from differentiating the current waveforms shown in FIG. 5.

Figure 5:
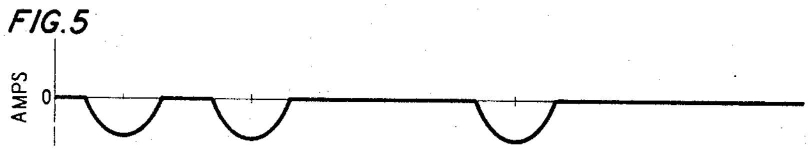
Figure 6:
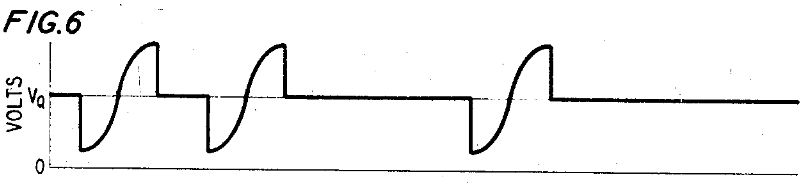

A waveform showing an ideal differentation by the inductance L1 of the waveform of FIG. 5 is shown in FIG. 6. Thus there has been described a circuit having a single transistor, three steering diodes, and an inductance which cooperate to perform the functions of threshold detection, full-wave rectification, and differentation.

Figure 7:
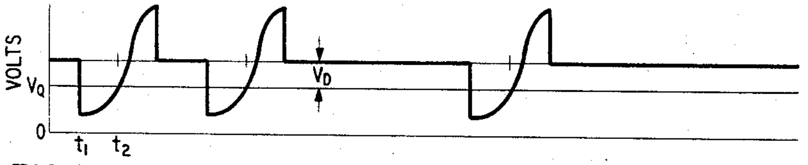

In FIG. 2 the resistor R7 couples the collector electrode 33 to a base electrode 42 of an NPN transistor Q2. The base electrode 42 is coupled through the resistor R8 to the power supply terminal 35. A waveform shown in FIG. 7 is a slightly distorted differentation of the signal shown in FIG. 5 and is a result of phase shift delay caused by the resistors R7 and R8. As previously stated, the series combination of the resistors R7 and R8 critically damps oscillations resulting from the presence of stray capacity in the inductance L1, but they are additionally selected such that they establish a threshold bias on signals applied to the base electrode 42. The threshold bias, shown in FIG. 7, has a value $V_D$ that compensates for the distortion of the differentiated waveform by producing a signal which crosses the quiescent potential $V_Q$ in approximate time coincidence with each peak of the input pulses shown in FIG. 4.

The resistor R9 and a reverse breakdown diode D4 in a series circuit couple the power supply terminal 35 to ground for establishing a reference potential on the terminal 31 equal to the potential $V_Q$. The cathode of the reverse breakdown diode D4 is directly connected to the terminal 31. The cathode of the diode D4 is coupled through a diode D5 to an emitter electrode 44 of the transistor Q2. The emitter electrode 44 is coupled to ground via a resistor R11. A resistor R10 couples a collector electrode 45 of the transistor Q2 to the power supply terminal 35.

The resistor R11 conducts a substantially constant current which is switched between the diode D5 and the transistor Q2. When the reference potential $V_Q$, applied to the anode of diode D5, is lower than the potential applied to the base electrode 42, the transistor Q2 conducts all of the current flowing through the resistor R11. Conversely, the diode D5 conducts all of the current flowing through the resistor R11 when the reference potential $V_Q$ is higher than the potential applied to the base electrode 42.

In a current switching circuit like the one including the transistor Q2 and the diode D5, it is desirable to provide a slightly off-set bias at their inputs so that the transistor is not biased in the high gain portion of its linear region of operation when there is no input signal. This high gain condition only exists in a narrow voltage range where the transistor Q2 and the diode D5 have essentially equal bias causing the current in resistor 11 to be shared by the transistor Q2 and the diode D5 rather than being switched to one or the other of them. The voltage drop $V_D$ (FIG. 7) across the resistor R7 produces a high enough potential on the base electrode 42 compared with the anode of the diode D5 so that the transistor Q2 conducts carrying all of the current from the resistor R11 when there is no input signal. The resistors R7 and R8 have been described as damping the resonance of the inductance L1, biasing the current switch Q2 to a predetermined conducting state, and compensating signals for the phase shift delay caused by the differentiating circuit.

Figure 8:
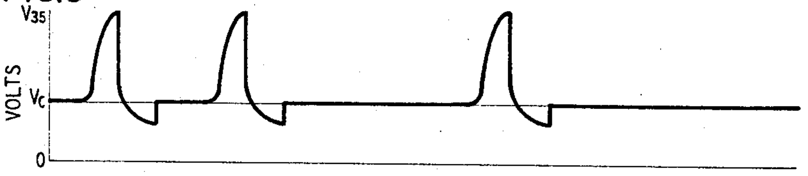

When a signal, negative with respect to the potential $V_Q$ (FIG. 7), is applied by way of the resistor R7 to the base electrode 42, the potential of the base electrode is reduced sufficiently to cut off the transistor Q2. Current flowing through the resistor R11 is then conducted through the diode D5. When a signal having the waveform of the FIG. 7 is applied to the base electrode 42, a signal waveform, shown in FIG. 8, is produced on the collector electrode 45. In FIG. 8, the potential on the collector electrode 45 is shown rising to the potential of the supply voltage V35 when the transistor Q2 is cut off and falling substantially to the potential $V_C$ when the transistor Q2 is turned on. The potential $V_C$ is the quiescent potential of the collector electrode 45 when the transistor Q2 is conducting.

The collector electrode 45 is coupled to a base electrode 50 of an NPN transistor Q3 by means of a capacitor C2. The base electrode 50 is coupled to the terminal 35 by means of a resistor R12. An emitter electrode 51 of the transistor Q3 is connected to ground and a collector electrode 52 of the transistor Q3 is coupled by means of a resistor R13 to the terminal 35. The transistor Q3 is biased to be normally conducting due to base current furnished by the resistor R12. An output terminal 53 for the detector circuit 25 is connected to the collector electrode 52. It is noted that the circuits of the transistors Q2 and Q3 are designed so that they cooperate to perform as a monostable multivibrator without a lock-up loop.

Figure 9:
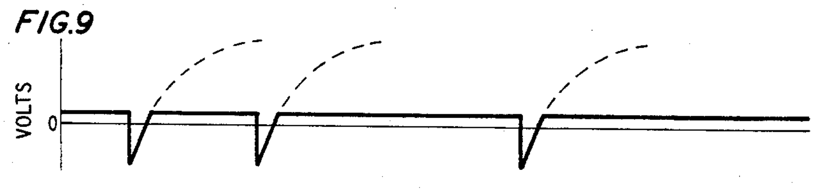
Figure 10:
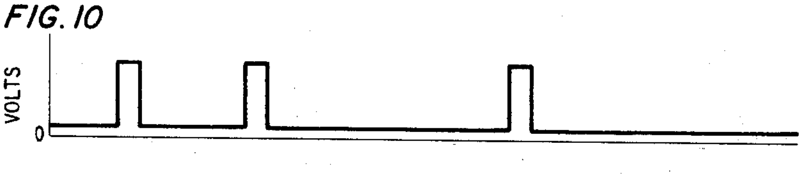

As the potential on the collector electrode 45 rises in a positive direction, the transistor Q3 is conducting in saturation so the current charging the capacitor C2 is carried to ground through the base-emitter junction of the transistor Q3. As shown in FIG. 9, the potential on base electrode 50 is unchanged during the positive swing of the signals shown in FIG. 8. When the turn-on of the transistor Q2 causes the voltage on the collector electrode 45 to make a negative-going transition, in approximate time coincidence with each peak of the input signals (FIG. 4), the transition is coupled via the capacitor C2 to the base electrode 50 in a waveform as shown in FIG. 9, and the transistor Q3 is cut off. Thus an output pulse of positive potential, as shown in FIG. 10, is produced at the collector electrode 52 and the terminal 53. An output pulse thus produced at the terminal 53 lasts for a period of time determined by the rate at which the capacitor C2 is exponentially charged (FIG. 9) by a current through the resistor R12. When the charge on the capacitor C2 reaches the base-emitter junction potential of the transistor Q3, the transistor Q3 conducts and terminates the output pulse. The waveform of FIG. 10 shows a series of typical output pulses produced at the terminal 53 in response to the series of input signals shown in FIG. 4. Because the transistor Q3 produces an output pulse which is initiated in response to a negative-going transition on the collector electrode 45, an output pulse on the collector electrode 52 is initiated in approximate time coincidence with the peak of an analog pulse from the source 20.

The above detailed description is by way of an illustration of one embodiment of the invention and it is understood that other embodiments thereof will be obvious to those skilled in the art. These additional embodiments are considered to be within the scope of the invention.

What is claimed is:

1. A circuit comprising a transistor having a base, an emitter, and a collector, a source producing first and second polarity input signals, means coupling said first polarity input signals to said base and coupling said second polarity signals to said emitter, said transistor producing output signals of a selected polarity at said collector in response to said first polarity input signals and producing output signals of said selected polarity at said collector in response to said second polarity input signals, an emitter circuit impedance coupled to said emitter, and a base circuit impedance coupled to said base, said base circuit impedance being substantially equal to said emitter circuit impedance and biasing said transistor to conduct a current in the absence of said input signals.

2. A circuit in accordance with claim 1 in which said coupling means comprises means clipping said input signals at a predetermined threshold level.

3. A circuit in accordance with claim 1 further comprising an inductance connected to said collector for differentiating said output signals.

4. A circuit in accordance with claim 3 in which said coupling means comprises means clipping said input signals at a predetermined threshold level.

5. A circuit in accordance with claim 1 in which said coupling means comprises means coupling said first polarity signals to said base, means coupling said second polarity signals to said emitter, and means producing a low impedance between said emitter and ground in response to said first polarity signals and producing a high impedance between said emitter and ground in response to said second polarity signals.

6. A circuit in accordance with claim 5 in which each of said coupling means comprises means clipping said input signals at a predetermined threshold level.

7. A circuit in accordance with claim 5 further comprising inductive means connected to said collector for differentiating said output signals.

8. A circuit in accordance with claim 7 in which said means coupling said first and second polarity signals comprise means clipping said input signals at a predetermined threshold level.

9. A circuit in accordance with claim 8 in which said input signals each have an amplitude peak, a source producing a reference potential, said inductance transforms said output signals to differentiated signals each crossing said reference potential coincident with one of said peaks, said circuit further comprising a common-emitter connected transistor comprising an emitter electrode resistively coupled to ground, a base electrode, and a collector electrode, means coupling said differentiated signals to said base electrode of said common-emitter connected transistor, a diode coupling said reference potential source to said emitter electrode of said common-emitter connected transistor, and said common-emitter connected transistor producing an output signal pulse at said collector electrode, said output signal terminating coincident with said peaks in response to each of said differentiated signals having a potential greater than said reference potential.

10. A circuit comprising a signal source producing a series of input signals each having an amplitude peak, means coupled to said source producing full-wave rectified signals in response to said input signals, a source producing a reference potential, differentiating means coupled to said producing means transforming said full-wave rectified signals to differentiated signals each crossing said reference potential coincident with one of said peaks, a common-emitter connected transistor comprising an emitter electrode resistively coupled to ground, a base electrode, and a collector electrode, means coupling said differentiated signals to said base electrode, a diode coupling said reference potential to said emitter electrode, and said transistor producing an output signal pulse at said collector electrode, said output signal terminating coincident with said peaks in response to each of said differentiated signals having a potential greater than said reference potential.

11. A circuit in accordance with claim 10 further comprising a grounded-emitter connected transistor having a base and a collector, timing means coupling said collector electrode of said common-emitter transistor to said base of said grounded-emitter transistor, and said collector of said grounded-emitter transistor rising in potential in response to termination of each said output signal.

12. In combination a source producing positive and negative polarity input signals each having a peak, a power supply, a first transistor having a base, an emitter, and a collector, a first diode coupling said source to said base in response to said positive polarity signals, a first resistive means coupling said base to said power supply, a second resistive means coupling said base to ground, a second diode coupled to said source, a third resistive means connected in series circuit between said emitter and said second diode for coupling said source to said emitter in response to said negative polarity signals, a third diode coupling a junction between said third resistive means and said second diode to ground in response to a positive input signal and producing a high impedance in response to a negative input signal, and a fourth resistive means coupled between said collector and said power supply, said collector producing full-wave rectified signals in response to said input signals.

13. A combination in accordance with claim 12 in which said first and second resistive means form a voltage divider forward biasing said first transistor and said third diode so that they are conducting a negligibly small current.

14. A combination in accordance with claim 12 comprising an inductive means coupling said collector to an intermediate junction of said first resistive means for differentiating said rectified signals.

15. A combination in accordance with claim 14 comprising a second transistor having a base, an emitter, and a collector, said fourth resistive means being a voltage divider having an intermediate terminal connected to said base of said second transistor, a fifth resistive means coupling said emitter electrode of said second transistor to said ground, means establishing a reference potential on said intermediate junction of said first resistive means, a diode coupling said reference potential to said emitter electrode of said second transistor, a third transistor connected in a grounded-emitter configuration comprising an output, and said second and third transistors arranged as a monostable circuit initiating an output pulse at said output of said third transistor in response to each peak of said input signals.

16. A combination in accordance with claim 12 in which said first and second resistive means produce a resistance between said base of said first transistor and ground, said third resistive means having resistance equal to said resistance between said base of said first transistor and ground, a first resistor shunting said first diode, a second resistor shunting said second diode, said first and second resistors having equal resistance, and said third resistive means having resistance much lower than said resistance of said first and second resistors.

17. In combination in accordance with claim 16 in which said first and second resistors have a common junction, and a capacitive means couples said positive and negative input signals from said source to said common junction.

18. A circuit comprising a source of first and second polarity signals each having a peak amplitude,
means producing full-wave rectified signals in response to said first and second polarity signals, said producing means comprising first and second inputs and an output,
a first clipping means coupling said first polarity signals to said first input,
a second clipping means coupling said second polarity signals to said second input,
means coupled to said output for producing differentiated signals crossing a reference potential in response to peaks of said full-wave rectified signals, and
means coupled to said differentiating means for producing unipolar output pulses initiated in response to one of said differentiated signals crossing said reference potential in a preselected one of two possible directions.

19. In combination
a source producing first and second polarity input signals,
a power supply,
a transistor having a base, an emitter, and a collector,
a first unilateral conducting means coupling said source to said base in response to said first polarity input signals,
a first resistive means coupling said base to said power supply,
a second resistive means coupling said base to ground,
a second unilateral conducting means coupled to said source,
a third resistive means connected in series circuit between said emitter and said second unilateral conducting means for coupling said source to said emitter in response to said second polarity signals,
a third unilateral conducting means coupling a junction between said third resistive means and said second unilateral conducting means to ground in response to first polarity input signals and producing a high impedance in response to second polarity input signals, and
a fourth resistive means coupled between said collector and said power supply, said collector producing full-wave rectified signals in response to said input signals.

References Cited

UNITED STATES PATENTS

| | | | |
|---|---|---|---|
| 2,972,064 | 2/1961 | Hurlbut | 307—318 XR |
| 3,054,068 | 9/1962 | De Jong | 307—321 XR |
| 3,248,560 | 4/1966 | Leonard | 307—235 XR |
| 3,289,007 | 11/1966 | Zydney | 328—26 XR |

ARTHUR GAUSS, *Primary Examiner.*

J. ZAZWORSKY, *Assistant Examiner.*

U.S. Cl. X.R.

307—235, 237, 261; 328—26